Inventor:
Walter Max Hahnemann
by E. D. Phinney
Att'y

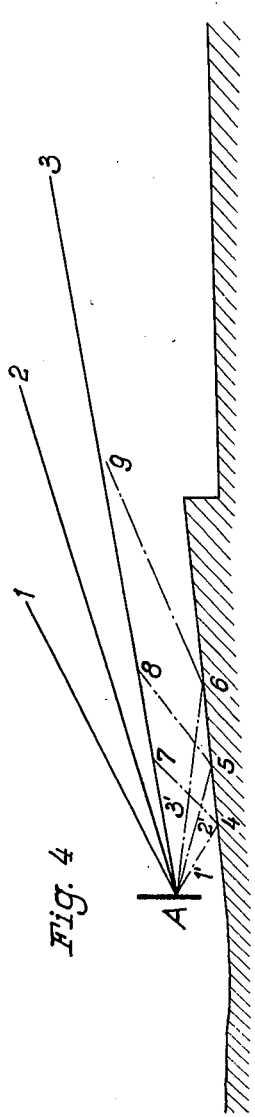
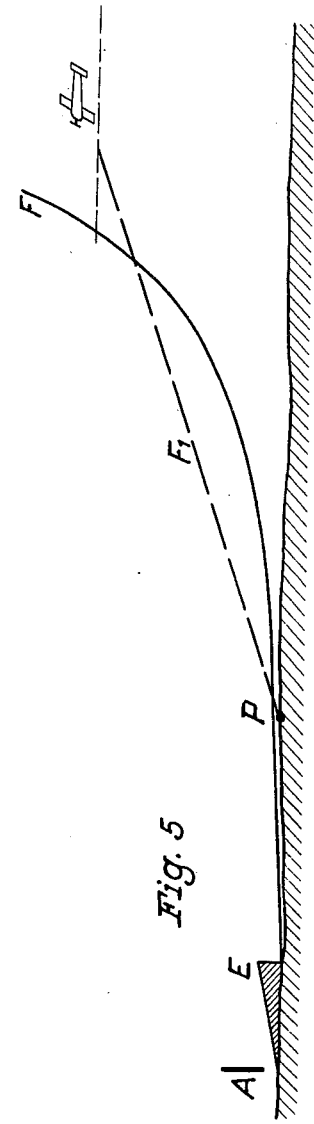
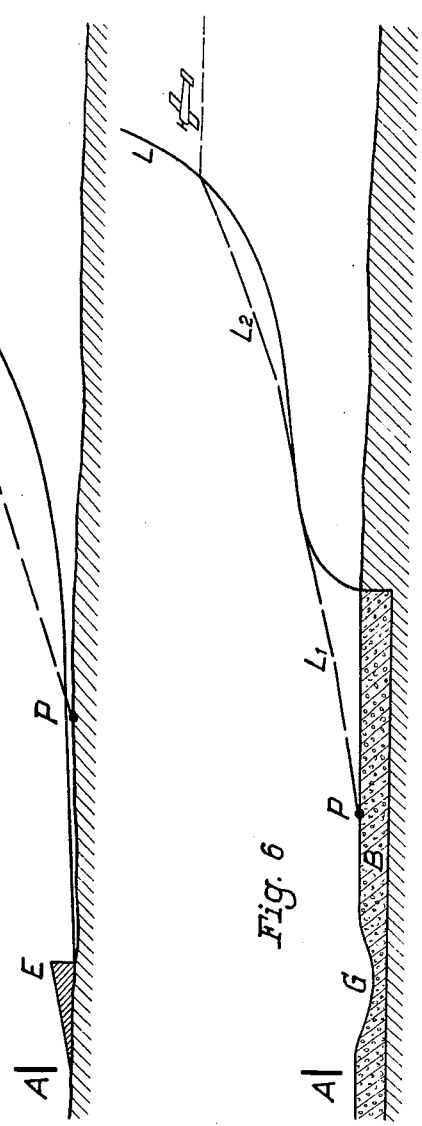

Patented Oct. 21, 1941

2,260,273

UNITED STATES PATENT OFFICE 2,260,273

METHOD AND SYSTEM FOR LANDING AIRCRAFT

Walter Max Hahnemann, Berlin, Germany, assignor to C. Lorenz Aktiengesellschaft, Berlin-Tempelhof, Germany, a company Application November 4, 1938, Serial No. 238,831
In Germany November 4, 1937

4 Claims. (Cl. 250—11)

It is well known in aircraft navigation to emit a club-shaped high frequency radiation obliquely upwards, in order to produce a so-called glide path or slipway, that is, a zone or curve of constant field intensity which aeroplanes are to follow when descending. As a rule, such club-shaped radiation patterns are produced by means of transmitting arrangements operated on ultra-short waves and in which the desired radiation pattern is originated by two radiations interfering with each other, namely a direct radiation from the transmitting antenna and an indirect radiation, that is, the radiation reflected by the earth's surface.

The invention is concerned with the production of glide paths which are free from certain disadvantages and which shall be as plane as possible, a plane shape thereof being the ideal case. The invention enables this ideal case to be attained with a close approximation.

Figure 1:
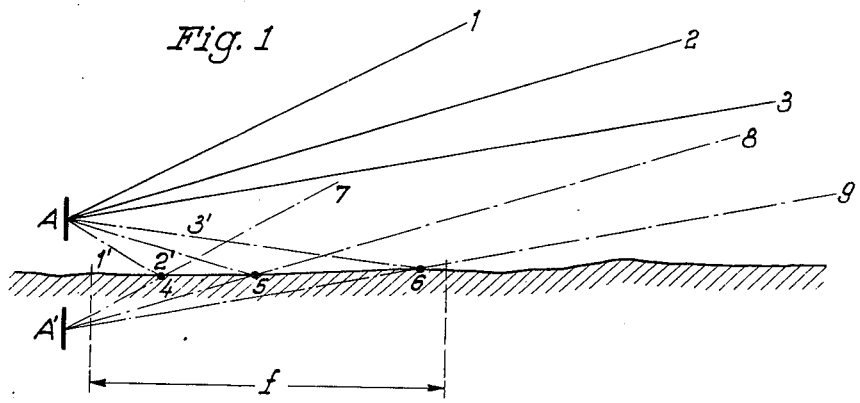

In the accompanying drawings Fig. 1 is a diagrammatic elevation that illustrates the principle of radiation peculiar to the systems here concerned, Figs. 2 to 6 are diagrammatic sectional elevations each representing one embodiment of the invention, Figs. 5 and 6 also showing examples of the result obtained by the invention.

In Figs. 1 to 4 beams 1, 2, 3 are represented directly to emanate from an antenna A, while beams 1', 2', 3', likewise emitted by this antenna, are reflected in points 4, 5, 6 of the ground. These reflected or indirect beams are designated 7, 8, 9. In the manner customary in optics the beams 7, 8, 9 may be supposed to arrive from a mirror reflection A' of antenna A. The field intensity effective at each point of the space above ground is determined by both the vector of the beams 1, 2, 3 and that of the beams 7, 8, 9. In general, the area f, Fig. 1, concerned with the reflection of beams such as 1', 2', 3', is substantially plane. The radiation pattern produced in this way is club-shaped, as stated before, and has the disadvantage that the glide paths of the same field intensity are too steep at higher altitudes, while being approximately horizontal immediately above the landing ground, as is illustrated by curve F, Fig. 5. Therefore, an aeroplane, in order to land, has to begin with a steep descent, and finally, when flying in the vicinity of the ground, has to follow a flat slipway. To land along glide path F is therefore objectionable in some respects, since the steep descent cannot be performed by aeroplanes of any type, and flying along the ground requires full motor power to be employed even shortly before touching the ground. Also, as will be seen in Fig. 5, glide path F strikes the ground at a point in risky vicinity of antenna A.

It has been ascertained that the shape of the glide paths depends upon the size and direction of the vectors of the direct and indirect radiations. The invention is based on this fact, according to which each point of the space above ground can be given the desired field intensity by properly adjusting the amplitude- and phase-conditions by which the two radiations are interrelated. To such end the invention provides for altering the direction of the indirect or reflected radiation, or sections thereof, in such manner as to obtain a predetermined glide path. For instance, the reflecting area f of the ground is given a shape by which the angles of reflection are varied accordingly. The invention thus essentially acts to vary the phase-conditions by which the direct and indirect radiations are interrelated.

Figure 2:
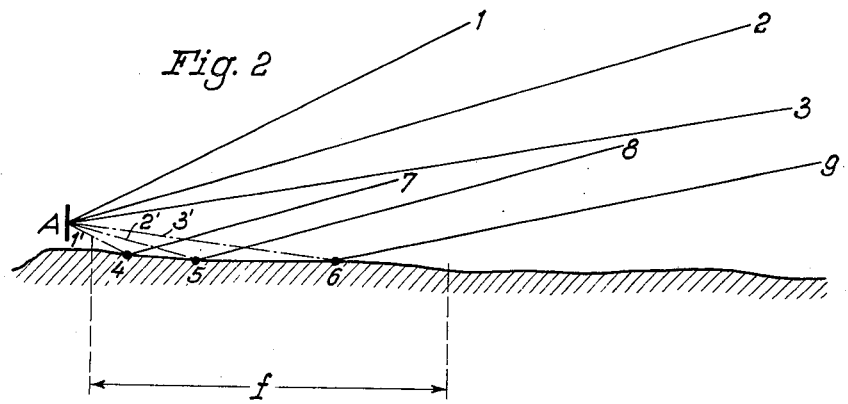

In Fig. 2 the amplitude- and phase-relations of the direct beams 1, 2, 3 are the same as in the case of Fig. 1. The ground area f, Fig. 2, is shown to be raised up in the area f and in a manner to be slanting from antenna A downward.

Figure 3:
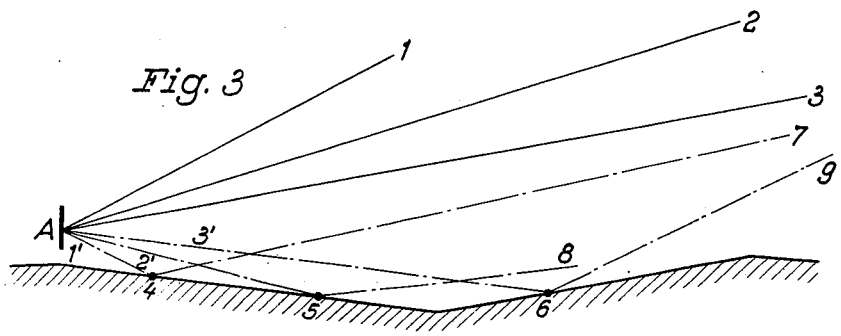

For the same purpose the ground may be dug out so as to provide it with a depression containing the points 4, 5, 6, Fig. 3, and which is of suitable shape to alter the angles of reflection in the desired manner.

In the modification represented in Fig. 4 by way of example the ground is made to present a reflecting surface that rises from below antenna A.

A reflecting surface of the kind illustrated in Fig. 4 is shown also in Fig. 5, being formed here by an upheaval E. This or any other suitable means, such as those represented in Figs. 2 to 4, enables to so adjust the angles of reflection that instead of a glide path of the shape shown by curve F, a substantially plane glide path, represented by curve F1, for instance, can be obtained. It will be seen that a glide path of this improved shape will enable a safe landing to be effected at a place P remote from antenna A.

It has been found also that the glide paths are deformed in a disadvantageous manner if the landing ground comprises areas of different electric conductivity. For instance, this phenomenon has been observed in the case of landing grounds provided with ferro-concrete runways, these increasing the field intensity that prevails in regions close to the ground.

This case is represented in Fig. 6 by way of example. Glide path L in consequence of the said increase in field intensity extends into the respective end of a ferro-concrete runway B, forming here a bulge, as shown. This bulge, striking the runway B almost at right angles, or nearly so, renders it impossible for the aeroplane safely to land on runway B. This drawback can likewise be overcome by suitably deflecting the indirect radiation. For instance, runway B may be provided with a depression G to such end. This depression, if appropriately shaped, will act to replace the said bulge of the glide path by a flat slipway L1 which strikes the runway B in a landing point P sufficiently remote from antenna A. In addition, the reflected radiation is so adjusted that in substantial altitudes the glide path has some such shape as indicated by line L2.

The invention is applicable to all the customary methods of obtaining glide paths of the said kind. For instance, it will be useful in arrangements having a vertical dipole, or arrangements in which directional antenna systems are provided. The invention is applicable also to devices in which two antenna fields are alternately keyed, that is to say, are alternately rendered effective and ineffective, in order to indicate to the pilot not only the glide path but also the direction he has to follow. A known arrangement of this kind has a continuously fed vertical dipole and reflector antennae disposed on opposite sides thereof and adapted to be keyed alternately.

What is claimed is:

1. In a radio transmitter system for producing an approximately straight line glide path for landing aircraft, comprising an antenna system spaced above the earth to produce a direct radiation and at the same time an indirect radiation by reflection from a given area of the earth's surface up to a given distance from said antenna system, the method of changing the normally curved radiation pattern for a given direction to a substantially straight line pattern consisting of changing the configuration of the earth's surface in said given reflecting area in a non-uniform shape for substantially all angles of reflection of the reflected radiation incident upon said given area, to produce an approximately straight line path of constant intensity radiation by interaction of said two radiations, and confining the elevation of the earth's surface after said change in configuration below the elevation of said antenna.

2. A method according to claim 1, in which the said change in configuration consists in shaping said reflecting area by forming it as an upheaval.

3. A method as defined in claim 1, in which the said change in configuration consists in shaping the said reflecting area as a depression in the earth's surface.

4. A radio transmitting system for producing an approximately straight line glide path for landing aircraft, comprising an antenna system to emit waves to produce a direct radiation and an indirect radiation by reflection from the earth's surface normally producing a curved constant intensity line, means rendering component areas around said antenna system different in conductivity to produce reflection of different strengths, the component areas adjacent said antenna system being of higher conductivity, said component areas of higher conductivity being configured non-uniformly to adjust the angles of reflection to produce the desired glide path by interaction with the direct radiation, said configured component areas being entirely below the highest elevation of said antenna system and so proportioned and arranged as to produce a substantially straight constant intensity line of radiation.

WALTER MAX HAHNEMANN.